United States Patent
Carnevale et al.

(10) Patent No.: US 10,629,205 B2
(45) Date of Patent: Apr. 21, 2020

(54) IDENTIFYING AN ACCURATE TRANSCRIPTION FROM PROBABILISTIC INPUTS

(71) Applicant: INTERNATIONAL BUSINESS MACHINES CORPORATION, Armonk, NY (US)

(72) Inventors: Giulia Carnevale, Rome (IT); Marco Gianfico, Sant'Antimo (IT); Ciro Ragusa, Rome (IT); Roberto Ragusa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 16/005,926

(22) Filed: Jun. 12, 2018

(65) Prior Publication Data
US 2019/0378513 A1    Dec. 12, 2019

(51) Int. Cl.
| G10L 21/00 | (2013.01) |
| G10L 15/26 | (2006.01) |
| G06N 3/12  | (2006.01) |
| G10L 15/05 | (2013.01) |
| G10L 15/14 | (2006.01) |

(52) U.S. Cl.
CPC ............ *G10L 15/265* (2013.01); *G06N 3/126* (2013.01); *G10L 15/05* (2013.01); *G10L 15/14* (2013.01)

(58) Field of Classification Search
CPC ....................................................... G10L 21/00
USPC ................. 704/270, 260, 243, 235, 231, 10; 434/157
See application file for complete search history.

(56) References Cited

U.S. PATENT DOCUMENTS

| 8,321,222 | B2* | 11/2012 | Pollet ...................... G10L 13/07 704/260 |
| 8,457,959 | B2* | 6/2013  | Kaiser ..................... G10L 15/24 704/231 |
| 8,644,611 | B2* | 2/2014  | Natarajan .......... G06K 9/00865 382/186 |
| 9,263,048 | B2* | 2/2016  | LeBeau ................. G06F 17/273 |

(Continued)

FOREIGN PATENT DOCUMENTS

CA    24811080    10/2010

OTHER PUBLICATIONS

Luong, Ngoc Quang; Word Confidence Estimation and Its Applications in Statistical Machine Translation; Doctorate Thesis; University of Grenoble; Aug. 7, 2006; 196 pages.

*Primary Examiner* — Michael C Colucci
(74) *Attorney, Agent, or Firm* — Schmeiser, Olsen & Watts; Mark C. Vallone (57) ABSTRACT

An approach is provided for identifying an accurate transcription of a sentence. Options for transcriptions of each word in the sentence are determined. Probabilistic scores of the options are determined. Variations of a transcription of the sentence are generated by randomly selecting from the options with the probabilistic scores weighting the selections. Plausibility scores for the variations are generated by performing syntactic, semantic, and redundancy analyses of the variations. Based on the plausibility scores, the probabilistic scores, and the variations, tentative transcriptions of the sentence are determined and refined repeatedly by employing a genetic evolution technique until a final refined tentative transcription is the accurate transcription of the sentence.

20 Claims, 6 Drawing Sheets

(56) References Cited

U.S. PATENT DOCUMENTS

| | | | |
|---|---|---|---|
| 9,330,661 B2* | 5/2016 | Mamou | G10L 15/08 |
| 9,692,984 B2* | 6/2017 | Lord | G06K 9/00993 |
| 2007/0118357 A1* | 5/2007 | Kasravi | G06F 17/273 |
| | | | 704/10 |
| 2010/0048242 A1* | 2/2010 | Rhoads | G06K 9/6253 |
| | | | 455/556.1 |
| 2012/0035959 A1* | 2/2012 | Berdia | G06F 19/325 |
| | | | 705/3 |
| 2013/0325442 A1* | 12/2013 | Dahlmeier | G06F 17/274 |
| | | | 704/9 |
| 2014/0052444 A1* | 2/2014 | Roberge | G10L 15/08 |
| | | | 704/243 |
| 2014/0295384 A1* | 10/2014 | Nielson | G09B 19/06 |
| | | | 434/157 |
| 2015/0279390 A1* | 10/2015 | Mani | G06F 16/345 |
| | | | 704/235 |
| 2016/0162456 A1* | 6/2016 | Munro | G06F 3/0482 |
| | | | 704/9 |
| 2016/0321241 A1* | 11/2016 | Mitsuishi | G06F 17/277 |

* cited by examiner

RANDOM COUPLING: — 308

Couple 1:
    Parent 1 (p1): what is the capable of grease
    Parent 2 (p2): what his the capital of Greece

...

⇩

N/2 CHILDREN: — 310

From Couple 1:
    Child 1: what(p1) is(p1) the(random) capital(p2) of(p1) grease(p1)
    Child 2: what(p2) ease(random) the(p1) capital(p2) of(p2) Greece(p2)

...

⇩

CREATE NEW SET OF N TRANSCRIPTION VARIATIONS BY ADDING THE N/2 CHILDREN TO THE N/2 PARENTS — 312

⇩

TENTATIVE SOLUTION:
what ease the capital of Greece — 314

⇩

REFINE SOLUTION VIA 100 ITERATIONS TO OBTAIN FINAL ACCURATE TRANSCRIPTION: what is the capital of Greece — 316

IDENTIFYING AN ACCURATE TRANSCRIPTION FROM PROBABILISTIC INPUTS

BACKGROUND

The present invention relates to speech and text recognition, and more particularly to identifying an accurate transcription of written text or speech.

Automatic systems for information extraction, decision making, theorem proving, and query answering usually perform complex calculations involving large knowledge bases and a corpus of deduction rules. The quality of the answer provided by an expert system is strongly correlated to the accuracy of the inputs. In many cases, the inputs are uncertain because they are the output of probabilistic systems, such as voice recognition, or statistical methods providing hypotheses. Assuming the most probable value for each input as the "correct" one is not optimal because alternate input combinations which could have generated a better result are discarded.

Because probabilistic inputs may generate a large number of input combinations, processing every one of the combinations is not feasible for computational complexity reasons. Limiting the number of alternatives for each input increases the probability of missing good answers, while still permitting the possibility of a large searching space that makes finding a solution infeasible. As one example, for a system that has only 50 inputs, limiting each input to only two alternatives generates a significant number (i.e., $2^{50}$) of scenarios. Known techniques that use semantic analysis to assign scores to words or word sequences must limit the number of inputs to low numbers, such as three to six, in order to keep the number of combinations of inputs at a manageable level.

SUMMARY

In one embodiment, the present invention provides a method of method of identifying an accurate transcription of a sentence. The method includes a computer determining multiple options for transcriptions of each word included in the words in the sentence initially received as written text or speech. The method further includes the computer determining probabilistic scores of the options. The probabilistic scores indicate respective likelihoods that the multiple options are accurate transcriptions of each word. The method further includes the computer generating variations of a transcription of the sentence by selecting from among the multiple options for the transcriptions of each word by using numbers generated by a hardware random number generator or a pseudorandom number generator. Selecting from among the options is weighted by the probabilistic scores. The method further includes the computer generating plausibility scores for the variations by performing syntactic, semantic, and redundancy analyses of the variations. The plausibility scores indicate respective likelihoods that the variations are plausible sentences. The method further includes based on the plausibility scores, the probabilistic scores, and the variations, the computer determining and refining tentative transcriptions of the sentence repeatedly until a final refined tentative transcription is the accurate transcription of the sentence by employing a genetic evolution technique on the variations.

The aforementioned embodiment provides a genetic evolution technique that efficiently explores a wide search space which has a significant number of inputs and a significant number of possible values for each input, thereby providing a large accuracy and speed gain against known techniques that use brute force search or brutal truncation of the exploration of the solution space. The aforementioned embodiment efficiently finds an accurate transcription of one or more sentences, without using hard trimming of input combinations that increase the probability of missing potentially accurate transcriptions. The aforementioned embodiment allows for a significant number of hypotheses for each word in a sentence and is open to a wide variety of interpretations of the text.

In one optional aspect of the aforementioned embodiment, the step of determining and refining the tentative transcriptions includes based on the plausibility scores, the computer dividing the variations into mutually exclusive first and second sets of the variations. The first set indicates sentences that are more plausible than any sentence indicated by the second set. The step of determining and refining the tentative transcriptions further includes the computer discarding the second set. The step of determining and refining the tentative transcriptions further includes the computer generating couples of first and second parent variations from the variations in the first set. The couples are generated by using numbers generated by the hardware random number generator or the pseudorandom number generator. The step of determining and refining the tentative transcriptions further includes the computer generating child variations by generating two child variations from each of the couples, where a word in each child variation is inherited from the first parent variation, inherited from the second parent variation, or is randomly selected from the multiple options for the transcription of the word based on the probabilistic scores by using the hardware random number generator or the pseudorandom number generator. The step of determining and refining the tentative transcriptions further includes the computer determining plausibility scores for the child variations. The step of determining and refining the tentative transcriptions further includes the computer adding the child variations to the first set of variations to create a new set of variations. The step of determining and refining the tentative transcriptions further includes the computer identifying a variation in the new set of variations as the variation having the greatest plausibility score. The step of determining and refining the tentative transcriptions further includes based on the identified variation having the greatest plausibility score, the computer determining the identified variation is a tentative transcription of the sentence. The aforementioned aspect provides a genetic exploration approach that efficiently searches a solution space while advantageously avoiding the computational complexity issues of known exhaustive search techniques that experience an exponential explosion of input combinations as the number of hypotheses for each input increases. The efficient search of the solution space advantageously avoids a need for a significant number of servers or other significant computing resources to find the accurate transcription; instead, the efficient search may be performed by using more limited computing resources such as a smartphone.

In one optional aspect of the aforementioned embodiment, the method further includes the computer determining the tentative transcription is not the accurate transcription of the sentence. The method further includes based on the tentative transcription not being the accurate transcription of the sentence, the computer refining the tentative transcription of the sentence by repeating the steps of dividing the variations, discarding the second set, generating the couples, generating the child variations, determining the plausibility scores for the child variations, adding the child variations to the first set, identifying the variation, and determining the identified variation is the tentative transcription of the sentence. The method further includes in response to the step of repeating being performed a predetermined number of times or a refined tentative transcription of the sentence is not an improvement over a previously refined tentative transcription by an amount that exceeds a predetermined threshold, the computer determining the refined tentative transcription of the sentence is the final refined tentative transcription. The method further includes the computer presenting the final refined tentative transcription as the accurate transcription of the sentence. The aforementioned aspect advantageously allows for an efficient search of the solution space because the repetitions (i.e., number of generations) in the genetic exploration approach may be kept to a number that is low enough that when multiplied by the number of words in the sentence is significantly less than the number of words raised to the power the number of hypotheses for each word, which is the greater computational complexity addressed by known exhaustive search techniques.

In one optional aspect of the aforementioned embodiment, the step of performing the syntactic, semantic, and redundancy analyses of the variations includes the computer generating first scores indicating measures of the syntaxes of the variations satisfying grammar rules. The step of performing the syntactic, semantic, and redundancy analyses of the variations further includes the computer generating second scores indicating frequencies of fragments of the variations being matched to fragments included in a corpus of documents. The step of performing the syntactic, semantic, and redundancy analyses of the variations further includes the computer generating third scores based on ratios of numbers of different words in sentences indicated by the variations and total numbers of words in the sentences indicated by the variations. The step of generating the plausibility scores for the variations includes generating each plausibility score by adding scores included in the first, second and third scores. The aforementioned aspect advantageously allows for scores to be calculated for an entire sentence.

In one optional aspect of the aforementioned embodiment, the step of performing the syntactic, semantic, and redundancy analyses of the variations includes the computer performing a redundancy analysis of a first variation included in the variations. Performing the redundancy analysis of the first variation includes determining a number d of different words in a sentence indicated by the first variation. Performing the redundancy analysis of the first variation further includes determining a total number t of words in the sentence indicated by the first variation. Performing the redundancy analysis of the first variation further includes determining a redundancy score of the first variation by calculating $100-100d/t$. The aforementioned aspect advantageously provides a scoring system based on entropy (i.e., a measure of word redundancy in the sentence), which cannot be used effectively in known exhaustive search techniques that are limited to a small number of words (e.g., 3 to 6 words).

In one optional aspect of the aforementioned embodiment, the method further includes the computer determining a redundancy score of a second variation included in the variations. The method further includes the computer determining that the redundancy score of the first variation is greater than the redundancy score of the second variation. The method further includes based on the redundancy score of the first variation being greater than the redundancy score of the second variation, the computer determining that the first variation is more likely than the second variation to be the accurate transcription of the sentence. The aforementioned aspect advantageously uses a redundancy score to distinguish between different transcriptions of the sentence in terms of accuracy.

In another embodiment, the present invention provides a computer program product for identifying an accurate transcription of a sentence. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system determining multiple options for transcriptions of each word included in the words in the sentence initially received as written text or speech. The method further includes the computer system determining probabilistic scores of the options. The probabilistic scores indicate respective likelihoods that the multiple options are accurate transcriptions of each word. The method further includes the computer system generating variations of a transcription of the sentence by selecting from among the multiple options for the transcriptions of each word by using numbers generated by a hardware random number generator or a pseudorandom number generator. Selecting from among the options is weighted by the probabilistic scores. The method further includes the computer system generating plausibility scores for the variations by performing syntactic, semantic, and redundancy analyses of the variations. The plausibility scores indicate respective likelihoods that the variations are plausible sentences. The method further includes based on the plausibility scores, the probabilistic scores, and the variations, the computer system determining and refining tentative transcriptions of the sentence repeatedly until a final refined tentative transcription is the accurate transcription of the sentence by employing a genetic evolution technique on the variations.

Advantages of the aforementioned computer program product embodiment include the advantages discussed above relative to the embodiment that provides the method of identifying an accurate transcription of a sentence. Optional aspects of the aforementioned computer program product embodiment include the aspects discussed above relative to the embodiment that provides the method of identifying an accurate transcription of a sentence. Advantages of the optional aspects of the computer program product embodiment include the advantages discussed above relative to the embodiment that provides the method of identifying an accurate transcription of a sentence.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method of identifying an accurate transcription of a sentence. The method includes the computer system determining multiple options for transcriptions of each word included in the words in the sentence initially received as written text or speech. The method further includes the computer system determining probabilistic scores of the options. The probabilistic scores indicate respective likelihoods that the multiple options are accurate transcriptions of each word. The method further includes the computer system generating variations of a transcription of the sentence by selecting from among the multiple options for the transcriptions of each word by using numbers generated by a hardware random number generator or a pseudorandom number generator. Selecting from among the options is weighted by the probabilistic scores. The method further includes the computer system generating plausibility scores for the variations by performing syntactic, semantic, and redundancy analyses of the variations. The plausibility scores indicate respective likelihoods that the variations are plausible sentences. The method further includes based on the plausibility scores, the probabilistic scores, and the variations, the computer system determining and refining tentative transcriptions of the sentence repeatedly until a final refined tentative transcription is the accurate transcription of the sentence by employing a genetic evolution technique on the variations.

Advantages of the aforementioned computer system embodiment include the advantages discussed above relative to the embodiment that provides the method of identifying an accurate transcription of a sentence. Optional aspects of the aforementioned computer system embodiment include the aspects discussed above relative to the embodiment that provides the method of identifying an accurate transcription of a sentence. Advantages of the optional aspects of the computer system embodiment include the advantages discussed above relative to the embodiment that provides the method of identifying an accurate transcription of a sentence.

DETAILED DESCRIPTION

Overview

Embodiments of the present invention iteratively progress to an accurate transcription of an entire sentence, multiple sentences, or a paragraph by generating random variations of a transcription based on probabilistic scores of options for each word in the sentence(s) or paragraph. Embodiments of the present invention employ a genetic algorithm (also known as a genetic evolution technique or a genetic exploration approach) to genetically evolve the variations by mating random couples of parent variations and including random mutation events based on the probabilistic scores of the options for each word.

Known techniques for recognizing words are limited by slow and inefficient processing of significantly large numbers of combinations. The known word recognition techniques use "goodness" metrics that evaluate the accuracy of recognizing a word or small numbers of words, but these conventional metrics are not specifically designed to address long sentences or paragraphs. The aforementioned limitations of slowness and inefficiency of the known techniques provide a unique challenge that is overcome by embodiments of the present invention, which employ a genetic evolution approach to evolve initial transcription variations created randomly according to probabilistic scores of each word option, thereby avoiding the processing of large numbers of combinations. Furthermore, embodiments of the present invention improve upon the conventional goodness metrics to address long sentences and paragraphs by using (1) a semantic analysis that may search a corpus of documents for text that matches an entire sentence of any length or multiple sentences, rather than a single word or a small number of words, and (2) a redundancy analysis that evaluates a variation of a transcription of one or more sentences that repeats words as being more accurate than another variation that does not repeat words.

System for Identifying an Accurate Transcription

Figure 1:
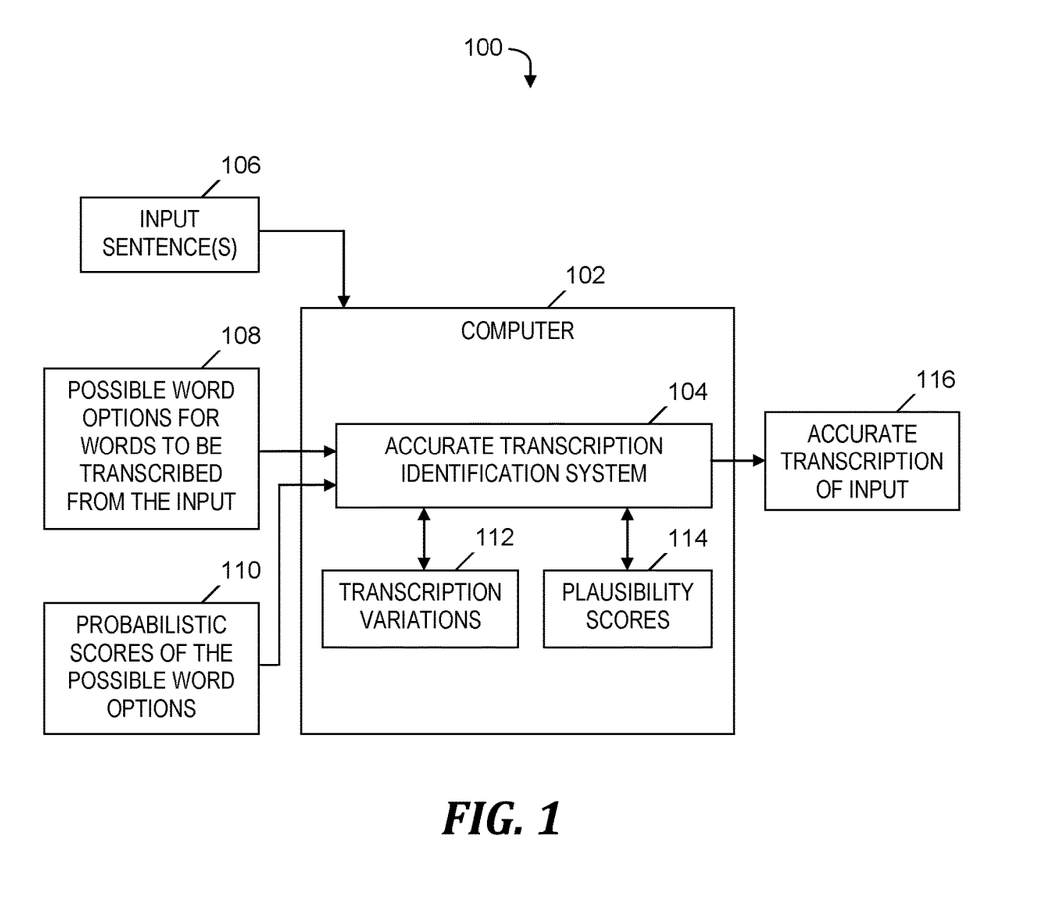
FIG. 1 is a block diagram of a system for identifying an accurate transcription, in accordance with embodiments of the present invention.

FIG. 1 is a block diagram of a system 100 for identifying an accurate transcription, in accordance with embodiments of the present invention. System 100 includes a computer 102 which executes a software-based accurate transcription identification system 104. Computer 102 receives input sentence(s) 106 as written text or as spoken speech. Sentence(s) 106 may be a single sentence, multiple sentences, sentences that comprise one or more paragraphs, or sentences that comprise an entire page of a document.

In one embodiment, an optical character recognition (OCR) system (not shown) applies OCR to input sentence(s) 106 which are written text to (i) identify possible word options 108 for the words to be transcribed from input sentence(s) 106 and (ii) determine probability scores 110 of the possible word options 108. The OCR system may be executed by computer 102 or by another computer (not shown). In another embodiment, a speech to text system (not shown) applies speech to text analysis to input sentence(s) 106 which are recorded speech to (i) identify possible word options 108 for the words to be transcribed from input sentence(s) 106 and (ii) determine probability scores 110 of the possible word options 108. The speech to text system may be executed by computer 102 or by another computer (not shown).

Accurate transcription identification system 104 randomly selects from among possible word options 108 for each word in input sentence(s) 106 to generate transcription variations 112 (i.e., variations of a transcription of input sentence(s) 106). The random selections are weighted based on probability scores 110. For example, for an input sentence "What is the capital of Greece," accurate transcription identification system 104 may determine a first variation, which is "hot his the captain of green," a second variation, which is "what ease the capable off grease," a third variation, which is "what is the capable of grease," etc.

Accurate transcription identification system 104 determines plausibility scores 114 of transcription variations 112. In one or more embodiments, accurate transcription identification system 104 determines plausibility scores 114 by employing syntactic analysis, semantic analysis, and redundancy analysis of text in each variation included in transcription variations 112.

Accurate transcription identification system 104 applies a genetic evolution technique to iteratively generate tentative transcriptions of input sentence(s) 106 that improve over the iterations until accurate transcription identification system 104 determines that the most recent tentative transcription (i.e., final tentative transcription) does not need to be refined further and designates the most recent tentative transcription as accurate transcription of input 116 (i.e., an accurate transcription of input sentence(s) 106).

The functionality of the components shown in FIG. 1 is described in more detail in the discussion of FIGS. 2A-2B, FIGS. 3A-3B, and FIG. 4 presented below.

Process for Identifying an Accurate Transcription

Figure 2A:
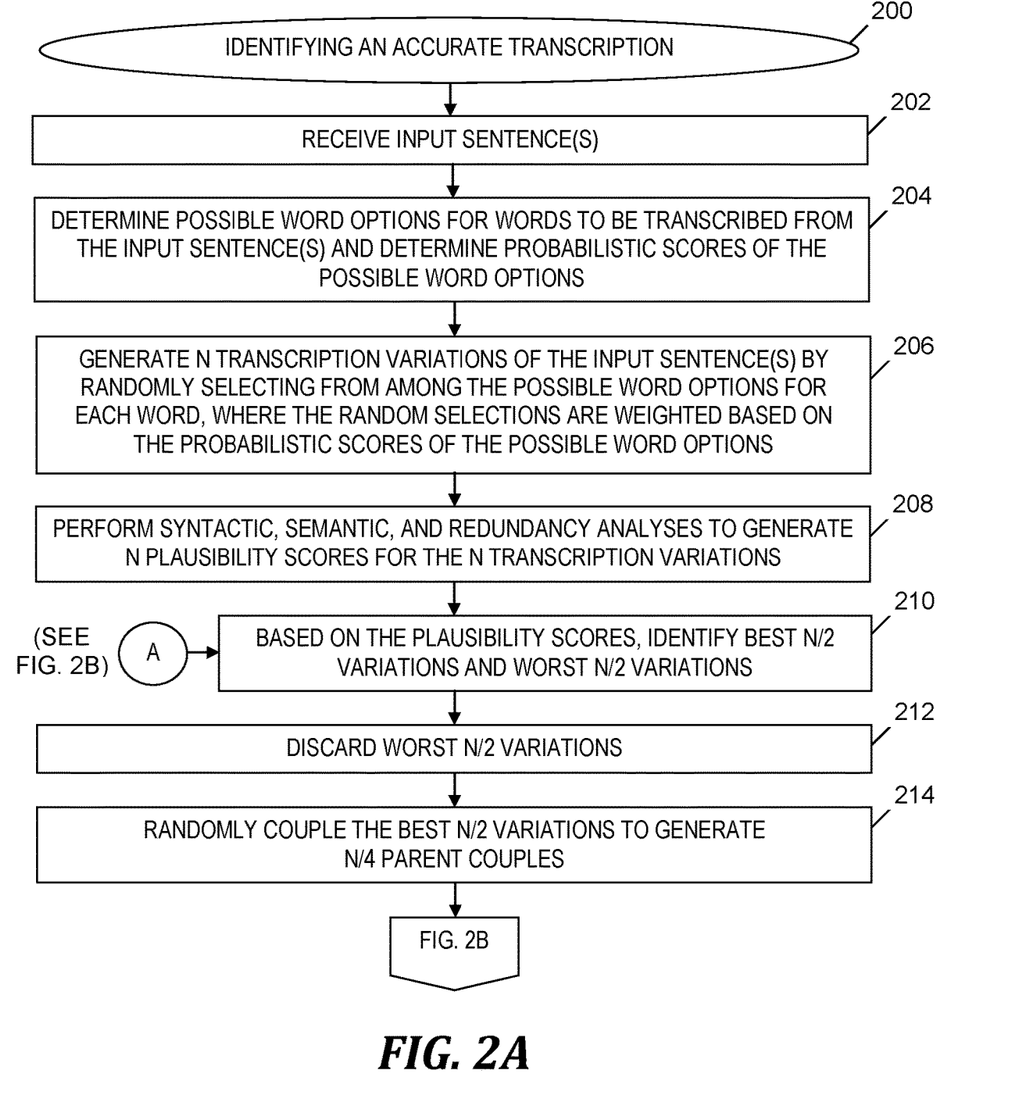
FIGS. 2A-2B depict a flowchart of a process of identifying an accurate transcription, where the process is implemented in the system of FIG. 1, in accordance with embodiments of the present invention.
Figure 2B:
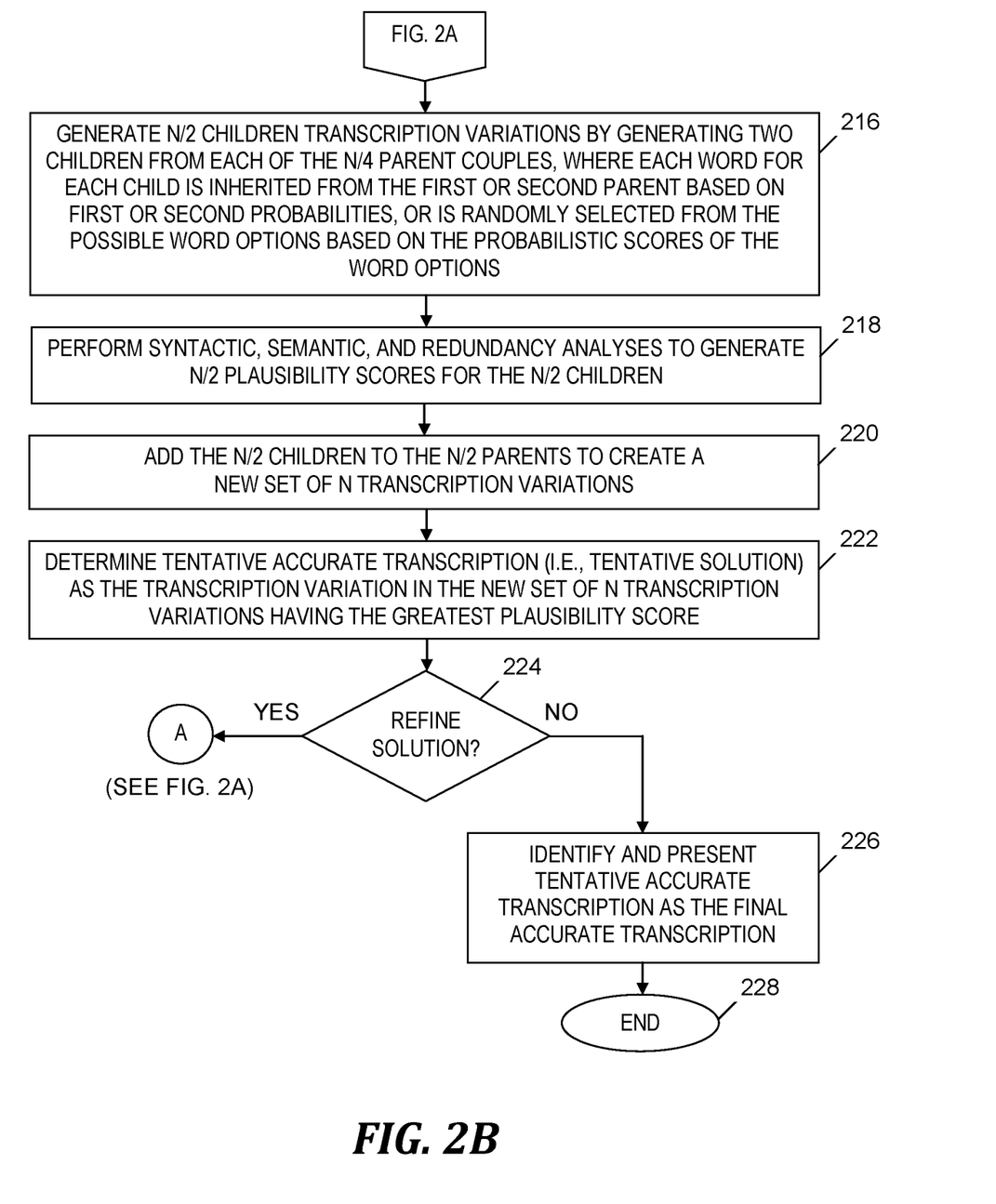

FIGS. 2A-2B depict a flowchart of a process of identifying an accurate transcription, where the process is implemented in the system of FIG. 1, in accordance with embodiments of the present invention. The process of FIGS. 2A-2B starts at step 200 in FIG. 2A. In step 202, accurate transcription identification system 104 (see FIG. 1) receives input sentence(s) 106 (see FIG. 1). In one embodiment, the input sentence(s) 106 (see FIG. 1) include 100 or more words.

In step 204, accurate transcription identification system 104 (see FIG. 1) determines possible word options 108 (see FIG. 1) for each of the words to be transcribed from input sentence(s) 106 (see FIG. 1) and determines probabilistic scores 110 (see FIG. 1) of the possible word options 108 (see FIG. 1). A probabilistic score included in probabilistic scores 110 (see FIG. 1) ranks a corresponding word option included in possible word options 108 (see FIG. 1) in proportion to the probability that the corresponding word option is the accurate transcription of the word included in input sentence(s) 106 (see FIG. 1). Alternatively, if probability estimates of possible word options 108 are not available, the word options are considered to be equiprobable.

As an example, step 202 includes accurate transcription identification system 104 (see FIG. 1) receiving a query expressed in natural language recorded in an audio file in an audio format. Computer 102 subjects the audio file to a speech to text conversion algorithm, which segments the audio file to isolate words, interprets the segmented audio file to identify words, and associates each identified word to its meaning. In the segmenting, interpreting and associating steps described above, the output is uncertain and many options are possible, thereby determining many possible variations of the query. Therefore, accurate transcription identification system 104 (see FIG. 1) lists many hypotheses for each word and determines a confidence score (i.e., a probabilistic score) for each option. Accurate transcription identification system 104 (see FIG. 1) determines that using a brute force, exhaustive search technique to identify a meaningful, accurate query from among all the possible variations is infeasible, and therefore continues with the steps of FIGS. 2A-2B described below.

In step 206, accurate transcription identification system 104 (see FIG. 1) generates N transcription variations of the input sentence(s) by randomly selecting from among possible word options 108 (see FIG. 1) for each word to be transcribed from input sentence(s) 106 (see FIG. 1). The random selections are weighted based on probabilistic scores 110 (see FIG. 1) of the possible word options 108 (see FIG. 1). As used herein in the discussion of FIGS. 2A-2B, N is an integer greater than or equal to four. N must be at least four because N/4 couples are generated in step 214, as discussed below. Accurate transcription identification system 104 (see FIG. 1) performs the random selections by using numbers generated by a hardware random number generator or a software-based pseudorandom number generator.

In step 208, accurate transcription identification system 104 (see FIG. 1) generates N plausibility scores for the N transcription variations, respectively, where the N transcription variations are generated in step 206. Accurate transcription identification system 104 (see FIG. 1) ranks the N transcription variations according to the corresponding N plausibility scores. In one embodiment, a first transcription variation having a higher plausibility score than a second transcription variation means that the first transcription variation is more meaningful, more accurate, more reasonable, and is better formed than the second transcription variation.

In one embodiment, accurate transcription identification system 104 (see FIG. 1) performs step 208 by performing syntactic, semantic, and redundancy analyses to generate respective syntactic, semantic, and redundancy scores of the N transcription variations. For each of the N transcription variations, accurate transcription identification system 104 (see FIG. 1) combines the corresponding syntactic, semantic, and redundancy scores to generate a plausibility score for the transcription variation. In one embodiment, the plausibility score for a transcription variation is the sum of the syntactic, semantic, and redundancy scores. By using a combination of the syntactic, semantic, and redundancy scores, a higher plausibility score indicates a transcription variation that is more syntactically sound, has a meaning that is more reasonable by the evidence of similar text in the corpus of documents, and has a tendency to repeat the same words. For example, if an input has nine instances of the word "Greece," but the transcription variations are selecting between "Greece" and "grease" for the nine instances, then the solution generated by accurate transcription identification system 104 (see FIG. 1) favors a solution that includes "Greece" being repeated nine times, which increases the redundancy score.

Prior to step 208, another system (not shown in FIG. 1) performs a lexical analysis of the words in input sentence(s) 106 (see FIG. 1) to ensure that the input sentence(s) received in step 202 are in a proper natural language by being matched with entries in a dictionary.

The aforementioned syntactic analysis includes accurate transcription identification system 104 (see FIG. 1) checking the transcription variations against grammar rules to measure how well the variations properly follow grammar rules and include an evaluation of the usage of subject, verb and object in a sentence, as well as verb conjugation, singular and plural concordance, etc. In response to the syntactic analysis, accurate transcription identification system 104 (see FIG. 1) outputs a syntactic score in a predetermined range of numbers (e.g., the integers 0 to 100, where 0 identifies an entirely improper grammar and 100 identifies a perfectly correct grammar).

The aforementioned semantic analysis includes accurate transcription identification system 104 (see FIG. 1) performing a search of the transcription variations in a corpus of documents. In one embodiment, accurate transcription identification system 104 (see FIG. 1) performs the searches at a sentence-level (i.e., each fragment being searched is a full sentence). Accurate transcription identification system 104 (see FIG. 1) maps the result of the search for each fragment to a score in a predetermined range (e.g., 0 to 100) and then calculates an average of the scores to generate an overall semantic score for the entire transcription variation.

The aforementioned redundancy analysis includes accurate transcription identification system 104 (see FIG. 1) determining the number of words in a transcription variation and the number of different words in the transcription variation and determining a redundancy score based on the aforementioned number of words and number of different words. In one embodiment, accurate transcription identification system 104 (see FIG. 1) calculates the redundancy score as:

$$100 - 100 * \frac{\text{number of different words in the variation}}{\text{total number of words in the variation}}$$

In step 210, based on the plausibility scores generated in step 208, accurate transcription identification system 104 (see FIG. 1) identifies the best N/2 transcription variations included in the N transcription variations and the worst N/2 transcription variations included in the N transcription variations. The best N/2 transcription variations are the transcription variations included in the N transcription variations that have the greatest N/2 plausibility scores among the N plausibility scores generated in step 208. The worst N/2 transcription variations are the transcription variations included in the N transcription variations that have the lowest N/2 plausibility scores among the N plausibility scores generated in step 208. Step 210 is the start of a loop used in a genetic evolution technique applied to the transcription variations to determine an accurate transcription of input sentence(s) 106 (see FIG. 1).

Step 210 also begins a loop in the process of FIGS. 2A-2B that implements a genetic evolution technique that identifies an accurate transcription variation from among a set of transcription variations.

In step 212, accurate transcription identification system 104 (see FIG. 1) discards the worst N/2 transcription variations identified in step 210 so that the discarded transcription variations may be replaced with new variations obtained through genetic evolution of the best N/2 transcription variations, as described in the remaining steps of the process of FIGS. 2A-2B.

In step 214, accurate transcription identification system 104 (see FIG. 1) generates N/4 parent couples of transcription variations by randomly coupling the transcription variations included in the best N/2 variations identified in step 210. Accurate transcription identification system 104 (see FIG. 1) performs the random coupling by using numbers generated by a hardware random number generator or a software-based pseudorandom number generator.

Following step 214, the process of FIGS. 2A-2B continues with step 216 in FIG. 2B. In step 216, accurate transcription identification system 104 (see FIG. 1) generates N/2 children transcription variations by generating two children transcription variations from each of the N/4 parent couples generated in step 214 (see FIG. 2A). For a given word in a child transcription variation generated from a parent couple consisting of first and second parents, accurate transcription identification system 104 (see FIG. 1) generates the word by (i) inheriting (i.e., selecting) the word from the first parent based on a first predetermined probability, (ii) inheriting the word from the second parent based on a second predetermined probability, or (iii) randomly selecting from the possible options for the word. Generating the word by randomly selecting from among the possible options for the word is based on a third predetermined probability. The possible options for the word are included in the possible word options 108 (see FIG. 1). The sum of the first, second, and third predetermined probabilities is equal to one. For example, accurate transcription identification system 104 (see FIG. 1) may (i) with a probability of 45%, inherit a word option for a first word from a first parent, or (ii) with a probability of 45%, inherit a word option for the first word from a second parent, or (iii) with a probability of 10% randomly select a word option from among the possible word options for the first word. For the random selection from the possible options for the word, accurate transcription identification system 104 (see FIG. 1) makes the selection based on the probabilistic scores that correspond to the possible options for the word, where the probabilistic scores corresponding to the possible options for the word are included in the probabilistic scores 110 (see FIG. 1). Furthermore, accurate transcription identification system 104 (see FIG. 1) uses a number generated by a hardware random number generator or a software-based pseudorandom number generator to make the random selection from the possible options for the word.

In step 218, accurate transcription identification system 104 (see FIG. 1) generates N/2 plausibility scores for the N/2 children transcription variations generated in step 216. In one embodiment, accurate transcription identification system 104 (see FIG. 1) performs step 218 by performing the aforementioned syntactic, semantic, and redundancy analyses on the N/2 children transcription variations.

In step 220, accurate transcription identification system 104 (see FIG. 1) adds the N/2 children transcription variations to the N/2 parent transcription variations (i.e., the best N/2 transcription variations identified in the most recent performance of step 210 in FIG. 2A) to create a new set of N transcription variations.

In step 222, accurate transcription identification system 104 (see FIG. 1) determines a tentative accurate transcription (i.e., a tentative solution) as the transcription variation in the new set of N transcription variations that has the greatest (i.e., highest) plausibility score.

In step 224, accurate transcription identification system 104 (see FIG. 1) determines whether the tentative solution determined in step 222 needs to be refined. In one embodiment, accurate transcription identification system 104 (see FIG. 1) refines the tentative solution a predetermined number of times (i.e., for a fixed number of generations by looping through the Yes branch of step 224 a predetermined number of times) (e.g., performs 100 iterations of the loop starting at the Yes branch of step 224). In another embodiment, accurate transcription identification system 104 (see FIG. 1) refines the tentative solution through the Yes branch of step 224 iteratively for at least a predetermined number of times and performs further iterative refinements until the plausibility score of the tentative solution does not improve over the previous tentative solution by a threshold amount (i.e., the fitness of the highest ranking solution is reaching or has reached a plateau such that successive iterations do not produce better results).

If accurate transcription identification system 104 (see FIG. 1) determines in step 224 that the tentative solution determined in step 222 needs to be refined, then the Yes branch of step 224 is followed and the process of FIGS. 2A-2B loops back to step 210 (see FIG. 2A) using the new set of N transcription variations.

If accurate transcription identification system 104 (see FIG. 1) determines in step 224 that the tentative solution determined in step 222 no longer needs to be refined, then the No branch of step 224 is followed and step 226 is performed.

In step 226, accurate transcription identification system 104 (see FIG. 1) identifies and presents the tentative accurate transcription as the final accurate transcription.

The process of FIGS. 2A-2B ends at step 228.

Example

Figure 3A:
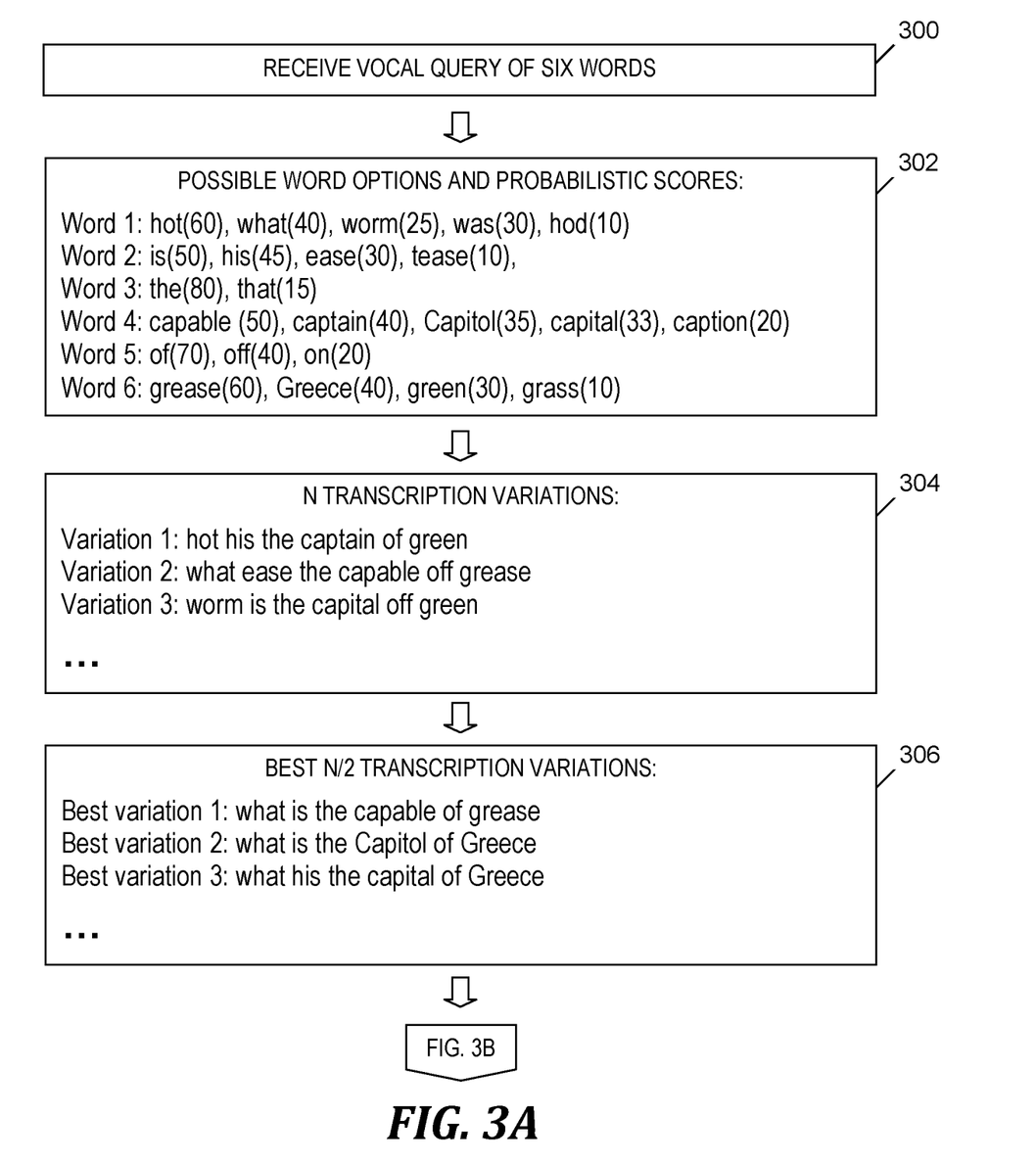
FIGS. 3A-3B depict an example of identifying an accurate transcription of a vocal query using the process of FIGS. 2A-2B, in accordance with embodiments of the present invention.

FIGS. 3A-3B depict an example of identifying an accurate transcription of a vocal query using the process of FIGS. 2A-2B, in accordance with embodiments of the present invention. In step 300 in FIG. 3A, accurate transcription identification system 104 (see FIG. 1) receives a vocal query that consists of six words (i.e., Word 1, Word 2, ..., Word 6). Step 300 is an example of step 202 (see FIG. 2A)

In step 302, accurate transcription identification system 104 (see FIG. 1) determines the possible word options for Word 1, Word 2, ..., Word 6. For example, accurate transcription identification system 104 (see FIG. 1) determines that there are five possible word options for Word 1: hot, what, worm, was, and hod. In step 302, accurate transcription identification system 104 (see FIG. 1) also determines the probabilistic scores of the possible word options for each of Word 1, Word 2, ..., Word 6. In step 302, the probabilistic scores are in parentheses following the words to which the scores correspond. For instance, accurate transcription identification system 104 (see FIG. 1) determines that for the possible word options for Word 1, the probabilistic scores for hot, what, work, was, and hod are 60, 40, 25, 30, and 10, respectively. Step 302 is an example of step 204 (see FIG. 2A).

In step 304, accurate transcription identification system 104 (see FIG. 1) generates N transcription variations, including Variations 1, 2, and 3, which are "hot his the captain of green," "what ease the capable off grease," and "worm is the capital off green," respectively. Step 304 is an example of step 206 (see FIG. 2A).

In step 306, accurate transcription identification system 104 (see FIG. 1) determines plausibility scores for the N transcription variations, ranks the N transcription variations according to the plausibility scores, and identifies the best N/2 transcription variations according the ranking, where the best N/2 transcription variations include Best variations 1, 2, and 3, which include "what is the capable of grease," "what is the Capitol of Greece," and "what his the capital of Greece," respectively. Accurate transcription identification system 104 (see FIG. 1) determines the plausibility scores by performing the syntactic, semantic, and redundancy analyses on the N transcription variations generated in step 304. Step 306 is an example of steps 208 and 210 in FIG. 2A.

Figure 3B:
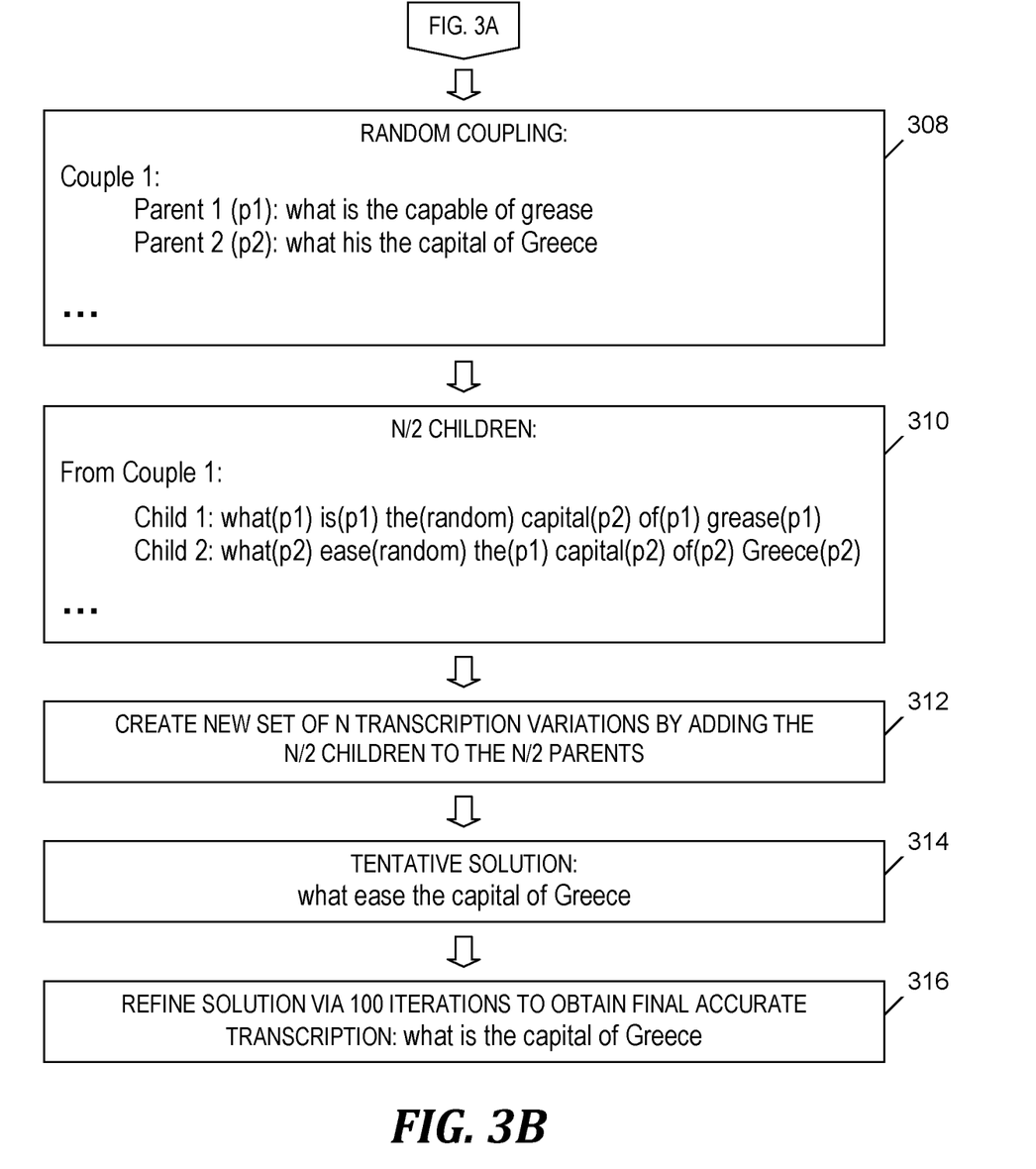

In step 308 in FIG. 3B, accurate transcription identification system 104 (see FIG. 1) randomly couples the variations included in the best N/2 transcription variations (i.e., the best N/2 parent transcription variations), which generates N/4 parent couples of transcription variations, including Couple 1 which consists of Parent 1 and Parent 2 (i.e., p1 and p2), where p1 is the transcription variation "what is the capable of grease" and p2 is the transcription variation "what his the capital of Greece." Step 308 is an example of step 214 (see FIG. 2A).

In step 310, accurate transcription identification system 104 (see FIG. 1) generates N/2 children transcription variations by generating two child transcription variations from each of the N/4 parent couples, including the child transcription variation Child 1 and the child transcription variation Child 2 from Couple 1. For a given word in a child transcription variation which was generated from a couple consisting of a first and second parent, the word is (i) inherited from the first parent according to a first probability, (ii) inherited from the second parent according to a second probability, or (iii) randomly selected from the possible word options for the word based on the probabilistic scores of the word options.

In step 310, (p1) means the corresponding word is inherited from the first parent, (p2) means the corresponding word is inherited from the second parent, and (random) means the corresponding word is randomly selected from the possible word options for the word.

For the example in step 310, the probability of inheriting from p1 is 45%, the probability of inheriting from p2 is 45% and the probability of randomly selecting from the possible word options is 10%. For Child 1, accurate transcription identification system 104 (see FIG. 1) inherits "what" as Word 1 from p1, inherits "is" as Word 2 from p1, randomly selects the word option "the" as Word 3, inherits "capital" as Word 4 from p2, inherits "of" as Word 5 from p1, and inherits "grease" as Word 6 from p1. For Child 2, accurate transcription identification system 104 (see FIG. 1) inherits "what" as Word 1 from p2, randomly selects the word option "ease" as Word 2, inherits "the" as Word 3 from p1, inherits "capital" as Word 4 from p2, inherits "of" as Word 5 from p2, and inherits "Greece" as Word 6 from p2. Step 310 is an example of step 216 (see FIG. 2B).

After step 310 and prior to step 312, accurate transcription identification system 104 (see FIG. 1) performs syntactic, semantic, and redundancy analyses to generate plausibility scores for the N/2 children generated in step 310.

In step 312, accurate transcription identification system 104 (see FIG. 1) creates a new set of N transcription variations by adding the N/2 children to the N/2 parent transcription variations that were used in the random coupling in step 308. Step 312 is an example of step 220 (see FIG. 2B).

In step 314, accurate transcription identification system 104 (see FIG. 1) determines a tentative solution by determining that "what ease the capital of Greece" has the greatest plausibility score among the new set of N transcription variations. The tentative solution of "what ease the capital of Greece" will guide successive iterations of the genetic evolution technique to generate an accurate transcription variation. Step 314 is an example of step 222 (see FIG. 2B).

In step 316, accurate transcription identification system 104 (see FIG. 1) refines the tentative solution via looping through the Yes branch of step 224 (see FIG. 2A) to iteratively perform step 210 in FIG. 2A through step 224 in FIG. 2B, which generates a tentative transcription of "what is the capital of Greece" after performing 100 iterations, which is equal to the predetermined number of 100 iterations. In step 316, accurate transcription identification system 104 (see FIG. 1) determines that no further refinements of the tentative transcription are needed because the predetermined number of iterations have been performed, and in response, identifies the most recent tentative transcription of "what is the capital of Greece" as the final accurate transcription of the vocal query received in step 300 (see FIG. 3A). Step 316 is an example of step 224 (see FIG. 2B), iteratively performing the loop starting at the Yes branch of step 224 (see FIG. 2B), and step 226 (see FIG. 2B).

Computer System

Figure 4:
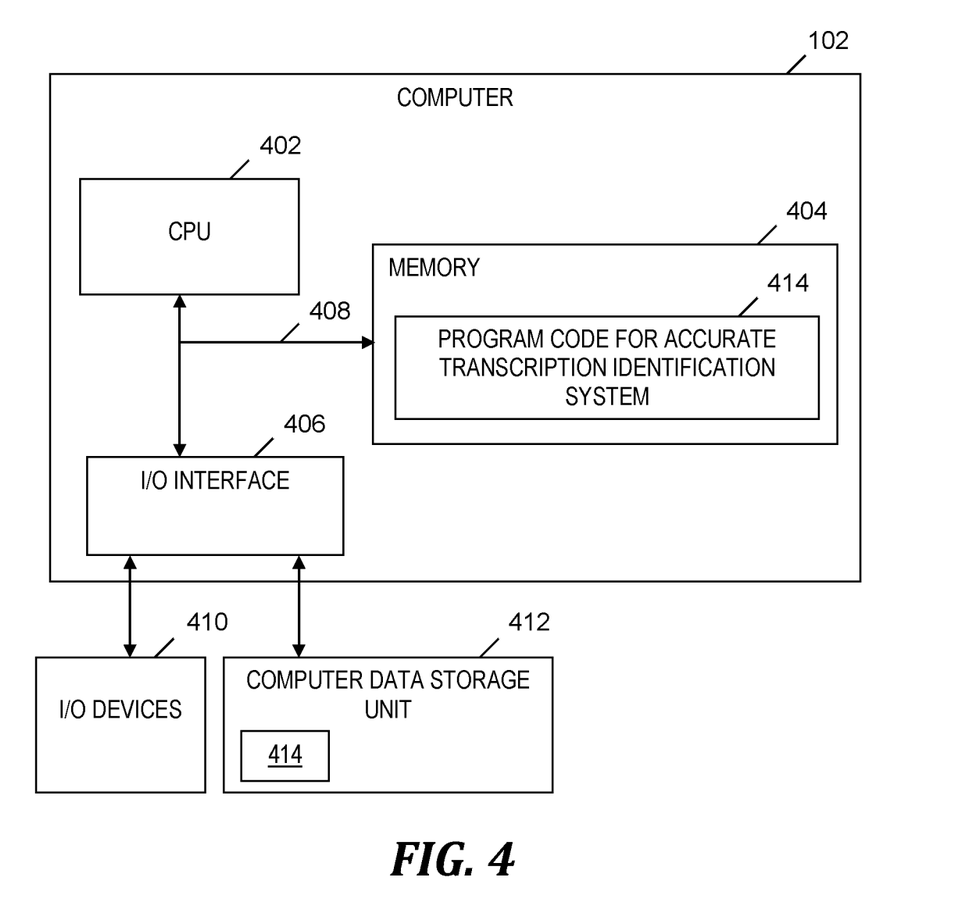
FIG. 4 is a block diagram of a computer included in the system of FIG. 1 and that implements the process of FIGS. 2A-2B, in accordance with embodiments of the present invention.

FIG. 4 is a block diagram of a computer 102 included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for accurate transcription identification system 104 (see FIG. 1) to perform a method of identifying an accurate transcription, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to identify an accurate transcription. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 and/or one or more other computer data storage units (not shown) that are coupled to computer 102 may include possible word options 108 (see FIG. 1), probabilistic scores 110 (see FIG. 1), transcriptions variations 112 (see FIG. 1) and/or plausibility scores 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to identifying an accurate transcription. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to identify an accurate transcription. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of identifying an accurate transcription.

While it is understood that program code 414 for identifying an accurate transcription may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of identifying an accurate transcription. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of identifying an accurate transcription of a sentence, the method comprising the steps of:
  a computer determining multiple options for transcriptions of each word included in the words in the sentence initially received as written text or speech;
  the computer determining probabilistic scores of the options, the probabilistic scores indicating respective likelihoods that the multiple options are accurate transcriptions of each word;
  the computer generating variations of a transcription of the sentence by selecting from among the multiple options for the transcriptions of each word by using numbers generated by a hardware random number generator or a pseudorandom number generator, the selecting being weighted by the probabilistic scores;

the computer generating plausibility scores for the variations by performing syntactic, semantic, and redundancy analyses of the variations, the plausibility scores indicating respective likelihoods that the variations are plausible sentences; and based on the plausibility scores, the probabilistic scores, and the variations, the computer determining and refining tentative transcriptions of the sentence repeatedly until a final refined tentative transcription is the accurate transcription of the sentence by employing a genetic evolution technique on the variations.

2. The method of claim 1, wherein the step of determining and refining the tentative transcriptions includes the steps of:

based on the plausibility scores, the computer dividing the variations into mutually exclusive first and second sets of the variations, the first set indicating sentences that are more plausible than any sentence indicated by the second set;

the computer discarding the second set;

the computer generating couples of first and second parent variations from the variations in the first set, the couples being generated by using numbers generated by the hardware random number generator or the pseudorandom number generator;

the computer generating child variations by generating two child variations from each of the couples, where a word in each child variation is inherited from the first parent variation, inherited from the second parent variation, or is randomly selected from the multiple options for the transcription of the word based on the probabilistic scores by using the hardware random number generator or the pseudorandom number generator;

the computer determining plausibility scores for the child variations;

the computer adding the child variations to the first set of variations to create a new set of variations; and the computer identifying a variation in the new set of variations as the variation having the greatest plausibility score and based on the identified variation having the greatest plausibility score, the computer determining the identified variation is a tentative transcription of the sentence.

3. The method of claim 2, further comprising the steps of:
the computer determining the tentative transcription is not the accurate transcription of the sentence;

based on the tentative transcription not being the accurate transcription of the sentence, the computer refining the tentative transcription of the sentence by repeating the steps of dividing the variations, discarding the second set, generating the couples, generating the child variations, determining the plausibility scores for the child variations, adding the child variations to the first set, identifying the variation, and determining the identified variation is the tentative transcription of the sentence; and in response to the step of repeating being performed a predetermined number of times or a refined tentative transcription of the sentence is not an improvement over a previously refined tentative transcription by an amount that exceeds a predetermined threshold, the computer determining the refined tentative transcription of the sentence is the final refined tentative transcription; and the computer presenting the final refined tentative transcription as the accurate transcription of the sentence.

4. The method of claim 1, wherein the step of performing the syntactic, semantic, and redundancy analyses of the variations includes the steps of:

the computer generating first scores indicating measures of the syntaxes of the variations satisfying grammar rules;

the computer generating second scores indicating frequencies of fragments of the variations being matched to fragments included in a corpus of documents; and the computer generating third scores based on ratios of numbers of different words in sentences indicated by the variations and total numbers of words in the sentences indicated by the variations, wherein the step of generating the plausibility scores for the variations includes generating each plausibility score by adding scores included in the first, second and third scores.

5. The method of claim 1, wherein the step of performing the syntactic, semantic, and redundancy analyses of the variations includes the step of the computer performing a redundancy analysis of a first variation included in the variations by:

determining a number d of different words in a sentence indicated by the first variation;

determining a total number t of words in the sentence indicated by the first variation; and determining a redundancy score of the first variation by calculating $100-100d/t$.

6. The method of claim 5, further comprising the steps of:
the computer determining a redundancy score of a second variation included in the variations;

the computer determining that the redundancy score of the first variation is greater than the redundancy score of the second variation; and based on the redundancy score of the first variation being greater than the redundancy score of the second variation, the computer determining that the first variation is more likely than the second variation to be the accurate transcription of the sentence.

7. The method of claim 1, further comprising the steps of:
the computer receiving the sentence as a query expressed in natural language in a recorded voice;

the computer identifying the words in the sentence by segmenting an audio file that stores the recorded voice and interpreting the segmented audio file; and the computer associating the identified words with respective meanings, wherein the multiple options for the transcriptions of each word are based on multiple results of each of the steps of segmenting the audio file, interpreting the segmented audio file, and associating the identified words with the respective meanings.

8. The method of claim 1, further comprising the step of:
providing at least one support service for at least one of creating, integrating, hosting, maintaining, and deploying computer readable program code in the computer, the program code being executed by a processor of the computer to implement the steps of determining the multiple options for the transcriptions of each word, determining the probabilistic scores, generating the variations of the transcription of the sentence, generating the plausibility scores for the variations, and determining and refining tentative transcriptions of the sentence repeatedly until the final refined tentative transcription is the accurate transcription of the sentence.

9. A computer program product for identifying an accurate transcription of a sentence, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:

the computer system determining multiple options for transcriptions of each word included in the words in the sentence initially received as written text or speech;

the computer system determining probabilistic scores of the options, the probabilistic scores indicating respective likelihoods that the multiple options are accurate transcriptions of each word;

the computer system generating variations of a transcription of the sentence by selecting from among the multiple options for the transcriptions of each word by using numbers generated by a hardware random number generator or a pseudorandom number generator, the selecting being weighted by the probabilistic scores;

the computer system generating plausibility scores for the variations by performing syntactic, semantic, and redundancy analyses of the variations, the plausibility scores indicating respective likelihoods that the variations are plausible sentences; and based on the plausibility scores, the probabilistic scores, and the variations, the computer system determining and refining tentative transcriptions of the sentence repeatedly until a final refined tentative transcription is the accurate transcription of the sentence by employing a genetic evolution technique on the variations.

10. The computer program product of claim 9, wherein the step of determining and refining the tentative transcriptions includes the steps of:

based on the plausibility scores, the computer system dividing the variations into mutually exclusive first and second sets of the variations, the first set indicating sentences that are more plausible than any sentence indicated by the second set;

the computer system discarding the second set;

the computer system generating couples of first and second parent variations from the variations in the first set, the couples being generated by using numbers generated by the hardware random number generator or the pseudorandom number generator;

the computer system generating child variations by generating two child variations from each of the couples, where a word in each child variation is inherited from the first parent variation, inherited from the second parent variation, or is randomly selected from the multiple options for the transcription of the word based on the probabilistic scores by using the hardware random number generator or the pseudorandom number generator;

the computer system determining plausibility scores for the child variations;

the computer system adding the child variations to the first set of variations to create a new set of variations; and the computer system identifying a variation in the new set of variations as the variation having the greatest plausibility score and based on the identified variation having the greatest plausibility score, the computer system determining the identified variation is a tentative transcription of the sentence.

11. The computer program product of claim 10, wherein the method further comprises the steps of:

the computer system determining the tentative transcription is not the accurate transcription of the sentence;

based on the tentative transcription not being the accurate transcription of the sentence, the computer system refining the tentative transcription of the sentence by repeating the steps of dividing the variations, discarding the second set, generating the couples, generating the child variations, determining the plausibility scores for the child variations, adding the child variations to the first set, identifying the variation, and determining the identified variation is the tentative transcription of the sentence; and in response to the step of repeating being performed a predetermined number of times or a refined tentative transcription of the sentence is not an improvement over a previously refined tentative transcription by an amount that exceeds a predetermined threshold, the computer system determining the refined tentative transcription of the sentence is the final refined tentative transcription; and the computer system presenting the final refined tentative transcription as the accurate transcription of the sentence.

12. The computer program product of claim 9, wherein the step of performing the syntactic, semantic, and redundancy analyses of the variations includes the steps of:

the computer system generating first scores indicating measures of the syntaxes of the variations satisfying grammar rules;

the computer system generating second scores indicating frequencies of fragments of the variations being matched to fragments included in a corpus of documents; and the computer system generating third scores based on ratios of numbers of different words in sentences indicated by the variations and total numbers of words in the sentences indicated by the variations, wherein the step of generating the plausibility scores for the variations includes generating each plausibility score by adding scores included in the first, second and third scores.

13. The computer program product of claim 9, wherein the step of performing the syntactic, semantic, and redundancy analyses of the variations includes the step of the computer system performing a redundancy analysis of a first variation included in the variations by:

determining a number d of different words in a sentence indicated by the first variation;

determining a total number t of words in the sentence indicated by the first variation; and determining a redundancy score of the first variation by calculating $100-100d/t$.

14. The computer program product of claim 13, wherein the method further comprises the steps of:

the computer system determining a redundancy score of a second variation included in the variations;

the computer system determining that the redundancy score of the first variation is greater than the redundancy score of the second variation; and based on the redundancy score of the first variation being greater than the redundancy score of the second variation, the computer system determining that the first variation is more likely than the second variation to be the accurate transcription of the sentence.

15. A computer system comprising:
a central processing unit (CPU);
a memory coupled to the CPU; and a computer readable storage medium coupled to the CPU, the computer readable storage medium containing instructions that are executed by the CPU via the memory to implement a method of identifying an accurate transcription of a sentence, the method comprising the steps of:
- the computer system determining multiple options for transcriptions of each word included in the words in the sentence initially received as written text or speech;
- the computer system determining probabilistic scores of the options, the probabilistic scores indicating respective likelihoods that the multiple options are accurate transcriptions of each word;
- the computer system generating variations of a transcription of the sentence by selecting from among the multiple options for the transcriptions of each word by using numbers generated by a hardware random number generator or a pseudorandom number generator, the selecting being weighted by the probabilistic scores;
- the computer system generating plausibility scores for the variations by performing syntactic, semantic, and redundancy analyses of the variations, the plausibility scores indicating respective likelihoods that the variations are plausible sentences; and
- based on the plausibility scores, the probabilistic scores, and the variations, the computer system determining and refining tentative transcriptions of the sentence repeatedly until a final refined tentative transcription is the accurate transcription of the sentence by employing a genetic evolution technique on the variations.

16. The computer system of claim 15, wherein the step of determining and refining the tentative transcriptions includes the steps of:
- based on the plausibility scores, the computer system dividing the variations into mutually exclusive first and second sets of the variations, the first set indicating sentences that are more plausible than any sentence indicated by the second set;
- the computer system discarding the second set;
- the computer system generating couples of first and second parent variations from the variations in the first set, the couples being generated by using numbers generated by the hardware random number generator or the pseudorandom number generator;
- the computer system generating child variations by generating two child variations from each of the couples, where a word in each child variation is inherited from the first parent variation, inherited from the second parent variation, or is randomly selected from the multiple options for the transcription of the word based on the probabilistic scores by using the hardware random number generator or the pseudorandom number generator;
- the computer system determining plausibility scores for the child variations;
- the computer system adding the child variations to the first set of variations to create a new set of variations; and
- the computer system identifying a variation in the new set of variations as the variation having the greatest plausibility score and based on the identified variation having the greatest plausibility score, the computer system determining the identified variation is a tentative transcription of the sentence.

17. The computer system of claim 16, wherein the method further comprises the steps of:
- the computer system determining the tentative transcription is not the accurate transcription of the sentence;
- based on the tentative transcription not being the accurate transcription of the sentence, the computer system refining the tentative transcription of the sentence by repeating the steps of dividing the variations, discarding the second set, generating the couples, generating the child variations, determining the plausibility scores for the child variations, adding the child variations to the first set, identifying the variation, and determining the identified variation is the tentative transcription of the sentence; and
- in response to the step of repeating being performed a predetermined number of times or a refined tentative transcription of the sentence is not an improvement over a previously refined tentative transcription by an amount that exceeds a predetermined threshold, the computer system determining the refined tentative transcription of the sentence is the final refined tentative transcription; and
- the computer system presenting the final refined tentative transcription as the accurate transcription of the sentence.

18. The computer system of claim 15, wherein the step of performing the syntactic, semantic, and redundancy analyses of the variations includes the steps of:
- the computer system generating first scores indicating measures of the syntaxes of the variations satisfying grammar rules;
- the computer system generating second scores indicating frequencies of fragments of the variations being matched to fragments included in a corpus of documents; and
- the computer system generating third scores based on ratios of numbers of different words in sentences indicated by the variations and total numbers of words in the sentences indicated by the variations, wherein the step of generating the plausibility scores for the variations includes generating each plausibility score by adding scores included in the first, second and third scores.

19. The computer system of claim 15, wherein the step of performing the syntactic, semantic, and redundancy analyses of the variations includes the step of the computer system performing a redundancy analysis of a first variation included in the variations by:
- determining a number d of different words in a sentence indicated by the first variation;
- determining a total number t of words in the sentence indicated by the first variation; and
- determining a redundancy score of the first variation by calculating $100-100d/t$.

20. The computer system of claim 19, wherein the method further comprises the steps of:
- the computer system determining a redundancy score of a second variation included in the variations;
- the computer system determining that the redundancy score of the first variation is greater than the redundancy score of the second variation; and
- based on the redundancy score of the first variation being greater than the redundancy score of the second variation, the computer system determining that the first variation is more likely than the second variation to be the accurate transcription of the sentence.

* * * * *